United States Patent Office 3,345,125
Patented Oct. 3, 1967

3,345,125
METHOD OF PURIFYING GASES
Martin Kruel, Essen, Harald Juentgen, Essen-Heisingen, and Heinrich Dratwa, Rheinhausen, Germany, assignors to Bergwerksverband G.m.b.H., Essen, Germany
No Drawing. Filed Nov. 14, 1966, Ser. No. 594,251
Claims priority, application Germany, Nov. 13, 1965,
B 84,496
12 Claims. (Cl. 23—2)

The present invention relates to a method of purifying gases and, more particularly, the present invention is concerned with the removal of sulfur dioxide and possibly also of sulfur trioxide from gaseous mixtures including such sulfur oxide, oxygen and steam.

Gaseous mixtures of this type include, for instance, flue gases, and the removal of the sulfur oxide or oxides is carried out in accordance with the present invention by adsorbing the sulfur oxide on a modified carbonaceous adsorbing agent.

It is well known to remove sulfur dioxide from industrial waste gases by means of carbonaceous adsorbing agents in the presence of oxygen and steam. Such adsorbing agents include activated carbon and so-called half coke made of peat, brown coal, bituminous coal and oxidized bituminous coal. The carbonaceous portion of the adsorbing agent which is used according to the present invention includes any of the carbonaceous material conventionally used as adsorbing agents for the purpose of removing sulfur dioxide in the presence of oxygen and steam from gases containing the same.

According to conventional methods, the $SO_2$ is first adsorbed at the carbonaceous adsorbing agent, then oxidized thereon to $SO_3$, by means of oxygen which is always present in small proportions in flue gases and the like, and the thus formed $SO_3$ will react immediately with the also present steam to form sulfuric acid. The practical utilization of this method is limited by the quick exhaustion of the carbonaceous adsorbing agent which makes the method impractical to perfom on an industrial scale.

It is therefore an object of the present invention to overcome the difficulties and disadvantages which are connected with conventional methods of purifying gases in the manner described above.

It is a further object of the present invention to provide a method of purifying gaseous mixtures including oxygen, steam and a sulfur oxide such as sulfur dioxide and/or sulfur trioxide by removal of the sulfur oxide therefrom, which method can be carried out on an industrial scale and in a particularly simple and economical manner.

It is yet another object of the present invention to provide a method of purifying gaseous mixtures of the type described above with a modified carbonaceous adsorbing agent which can be easily reactivated and thus used for prolonged periods of time.

Other objects and advantages of the present invention will become apparent from a further reading of the description and of the appended claims.

With the above and other objects in view, the present invention contemplates a method of purifying a gaseous mixture including oxygen, steam and at least one sulfur oxide by removal of the sulfur oxide therefrom, comprising the steps of causing intimate contact between the gaseous mixture and a particulate solid adsorbing agent consisting essentially of a carbonaceous material impregnated with a salt selected from the group consisting of water-soluble sulfates, nitrates and chlorides of at least one metal, so as to bind the sulfur oxide to the adsorbing agent in the form of $SO_3$ or $H_2SO_4$, thereby freeing the gas of the sulfur oxide and charging the adsorbing agent with a sulfur compound, heating the thus charged adsorbing agent at a temperature of between about 550° C. and 900° C. so as to desorb the sulfur compound and to reactivate the adsorbing agent, and subjecting the thus reactivated adsorbing agent to contact with additional gaseous mixture to be purified, for removal of sulfur oxide from the latter.

The repeated reactivation of the adsorbing agent which is carried out according to the present invention greatly improves the economy of the method. Essentially, the method of the present invention comprises the impregnation of the carbonaceous adsorbing agent with a water-soluble metal salt, particularly a sulfate, nitrate or chloride, adsorbing the $SO_2$ content of a gas on the thus impregnated carbonaceous adsorbing agent, and treating the adsorbing agent, which now has been charged with the sulfur oxide or sulfuric acid formed thereof, at a temperature of between about 550° C. and 900° C., preferably while simultaneously passing an inert gas through a particulate mass of the adsorbing agent, whereby the adsorbed sulfur compound will be desorbed and the adsorbing agent will be reactivated so that the latter may then be used again for the adsorption of additional sulfur oxides from subsequent portions of the gas or gaseous mixture which is to be purified. During the heat treatment for reactivating the adsorbing agent, simultaneously a desorption of the adsorbed sulfur compound takes place and the latter is released in the form of $SO_2$.

However, it is also possible, and usually desirable, to first heat the charged adsorbing agent at a temperature of between about 300° C. and 500° C. or 550° C., which temperature, although insufficient to reactivate the adsorbing agent, will suffice to desorb the sulfur compound.

It is possible to either case to recover a gas containing $SO_2$ in a relatively high concentration.

One of the reasons why it is desirable to first desorb the charged adsorbing agent at a relatively low temperature and only thereafter to reactivate the adsorbing agent by exposure to higher temperatures, is that the desorbed $SO_2$ is a highly corrosive gas and its corrosive strength increases with increasing temperatures. It is therefore desirable to obtain $SO_2$ at a relatively low temperature which must be high enough so that the $SO_2$ will be desorbed from the charged adsorbing agent but nevertheless should be sufficiently low so as to minimize the corrosive effects of the desorbed $SO_2$ gas or the gaseous mixture containing the same.

The impregnation of conventional carbonaceous adsorbing agents so as to obtain the modified adsorbing agent which is utilized according to the present invention can be carried out in various manners utilizing as the carbonaceous constituent, for instance, activated carbon, charcoal, particularly wood charcoal, peat coke, or half coke of lignite, brown coal or bituminous coal origin, as well as oxidized coals, and the like.

The carbonaceous material in particulate form, for instance in the form of particles having an average size of between 0.5 and 5 mm. may be soaked in an aqueous solution of the metal salt, or sprayed with the same and thereafter the excess water may be removed by evaporation. It is also possible to impregnate the carbonaceous material with the aqueous solution at reduced pressure after first thoroughly drying and degassing the carbonaceous adsorbing material. By utilizing a partial vacuum it is accomplished that the aqueous solution will very deeply penetrate into the pores of the adsorbing agent and this will result in a more uniform covering of the inner surfaces of the pores of the carbonaceous material with the dried metal salt.

All water-soluble metal salts may be used for the impregnation of the carbonaceous adsorbing agent, however, the sulfates, nitrates and chlorides appear to give particularly advantageous results. The metal of the respective salt preferably may be selected from the group consisting of copper, iron, nickel, cobalt, manganese, chromium and cerium. Thus, for all practical purposes, the method of the present invention preferably utilizes a carbonaceous adsorbing agent which has been impregnated with the sulfate, nitrate or chloride of either copper, iron, nickel, cobalt, manganese, chromium or cerium.

The removal of $SO_2$ from $SO_2$-containing gas mixtures by adsorbing of the $SO_2$ at the above-described impregnated carbonaceous adsorbing agent should be carried out at a temperature below 200° C., i.e. at a temperature which is safely below the minimum temperature at which desorption of the $SO_2$ would start. Preferably, adsorption of the $SO_2$ from the gas containing the same is carried out at temperatures between about 100° C. and 160° C. The $SO_2$ which is adsorbed by the impregnated carbonaceous adsorbing agent described above will be immediately converted into $SO_3$ and $H_2SO_4$. Any $SO_3$ which is initially present in the gas which is to be purified will also be bound by the adsorbing agent either as $SO_3$ or as $H_2SO_4$.

The heat-reactivation of the adsorbing agent requires a considerable length of time, generally between about 2 and 10 hours, preferably between about 4 and 6 hours. It is advantageous to carry out the heat-reactivation of the adsorbing agent in the presence of an inert gas stream, i.e. by blowing an inert gas through the particulate mass of impregnated carbonaceous adsorbing agent which is to be reactivated. Suitable inert gases include nitrogen, CO, $CO_2$, or also some industrial waste gases. However, the inert gases must not contain more than 2% by volume of oxygen and preferably should not contain more than about 1% by volume of oxygen.

Since the freshly impregnated carbonaceous adsorbing agent is practically without any adsorbing effects with respect to the $SO_2$ content of the gas, it is necessary to subject the freshly impregnated adsorbing agent, prior to its first use as adsorbing agent, to an activating treatment as described above, i.e. to heating for several hours at a temperature between about 550° C. and 900° C. and preferably in the presence of an inert gas, or while passing an inert gas through the mass of adsorbing agent. During the heat reactivation, the metal salts with which the carbonaceous adsorbing agent had been impregnated are converted into the effective metal compounds, probably the oxides or carbides of the respective metal. However, the present invention is not limited to any specific theory particularly with respect to the type of metal compounds which are formed during reactivation or activation of the impregnated carbonaceous material.

As pointed out above, the desorption of the sulfur compound in the form of $SO_2$ from the impregnated adsorbing agent may be carried out in a separate step prior to the reactivation of the impregnated adsorbing agent, by simply heating the charged adsorbing agent at a temperature of between about 300° C. and 500° C. Generally, treatment periods of between 30 minutes and 3 hours, preferably between 1 and 2 hours at a temperature within the range of between about 300° C. and 500° C., possibly up to 550° C., will suffice. The desorption of the sulfur compounds is favorably influenced by simultaneous treatment of the charged adsorbing agent with hot inert gases, for instance by blowing such inert gases through a particulate mass of charged adsorbing agent. Suitable inert gases include nitrogen, carbon dioxide and some industrial waste gases. The oxygen content of the inert gases which are blown through the charged adsorbing agent during desorption of the same within the above-described temperature range should not exceed 4% by volume and preferably should be below 2% by volume.

The passage of inert gases through the adsorbing material either during desorption of the same or during reactivation, or during desorption and reactivation will favor the respective process because the decomposition products or desorbed gaseous materials are more quickly withdrawn in the stream of inert gas. However, it is also possible to carry out desorption and reactivation without the passage of inert gas through the mass of adsorbing material.

One of the main reasons why it is preferred to desorb the bound or adsorbed sulfur compounds in the form of $SO_2$ at the relatively low temperatures of between about 300° C. and 500° C. is the fact that the desorbed $SO_2$, or a gaseous mixture containing the same, is highly corrosive and more so at higher temperatures. Thus, in order to withdraw a gas of only limited corrosive effect, it is desirable to carry out the desorption at a relatively low temperature, just sufficiently high to cause effective desorption within a reasonably short period of time.

The method of the present invention may be carried out, for instance, by passing the $SO_2$-containing gaseous mixture through towers or containers in which the carbonaceous adsorbing agent is maintained. The adsorbing agent, for instance, may be present in the form of a stationary layer, or in the form of a fluidized bed, or also in the form of a layer which slowly moves in countercurrent to the gases from which the $SO_2$ or the like is to be adsorbed. Preferably, the purification of the gas by adsorption of $SO_2$ by the impregnated adsorbing agent is carried out by slowing moving the adsorbing agent in downward direction, in countercurrent to the gas which is to be purified and which flows upwardly through the downwardly moving layer of particulate adsorbing material.

Table I summarizes the length of time for which the degree of desorption will be between an initial value of 100% and 90%. The table clearly shows the better effect which is achieved by utilizing the heat-activated impregnated adsorbing agent of the present invention.

The experiments which are summarized in Table I were carried out as follows:

80 liters per hour of a waste gas containing 0.3% by volume sulfur dioxide, 3% by volume oxygen and 6% by volume steam were passed at different temperatures through a tube having an inner diameter of 16 mm. and filled with 100 cm.³ of adsorption coke having a particle size of between 1 and 2 mm. The adsorbing layer in the tube had a height of 50 cm. and the velocity of the gas passing through the tube was 10 cm./sec. so that the residence time of the waste gas in the adsorption tube amounted to 5 seconds. The $SO_2$ concentration was continuously determined in the gas just before entering and after leaving the adsorbing layer, and the degree of desulfurization was determined from the difference of the two thus obtained values.

TABLE I.—TIME IN HOURS UNTIL DESULFURIZATION OF FLUE GAS IS ONLY 90% EFFECTIVE

| Metal Salts | Weight Percent Cation | Without Reactivation Adsorption Temp. (° C.) | | | Reactivating Temperature (° C.) | After Reactivation Adsorption Temp. (° C.) | | |
|---|---|---|---|---|---|---|---|---|
| | | 100 (hr.) | 120 (hr.) | 160 (hr.) | | 100 (hr.) | 120 (hr.) | 160 (hr.) |
| Activated Carbon of Oxidized Bituminous Coal, Particle size 1-2 mm | | 0.2 | 0.1 | 0.1 | | | | |
| Activated Carbon of Oxidized Bituminous Coal, Particle size 1-2 mm | Cu-SO$_4$ | 1 | 0.1 | 0.1 | 500 | 1.0 | 0.5 | 0.5 |
| | | | | | 900 | 9.0 | 8.0 | 2.8 |
| Peatcoke, 0.5-2 mm | Fe$_2$(SO$_4$)$_3$ | 3 | 0.2 | 0.1 | 500 | | 1.6 | 1.9 |
| | | | | | 900 | | 7.2 | 1.0 |
| | | 10 | 0.1 | | 500 | | 0.8 | 0.6 |
| | | | | | 900 | | 1.0 | 0.3 |
| Activated Carbon of Anthracite, 0-2 mm | Co-(NO$_3$)$_2$ | 5 | 0.1 | 0.1 | 600 | | 2.0 | 1.5 |
| | | | | | 800 | | 3.0 | 1.0 |
| Activated Carbon of Coconut Shells, 1-2 mm | Cr$_2$-(SO$_4$)$_3$ | 5 | <0.1 | <0.1 | 400 | | 2.2 | 1.25 |
| | | | | | 800 | | 5.75 | 2.3 |
| Activated Carbon of Charcoal, 0-2 mm | Mn-SO$_4$ | 1 | 0.1 | 0.1 | 600 | | 2.1 | 2.5 |
| | | | | | 800 | | 4.5 | 2.1 |
| Activated Carbon of Anthracite, 0.5-2 mm | Ce-(SO$_4$)$_2$ | 5 | 0.1 | 0.1 | 500 | | 2.1 | 1.5 |
| | | | | | 700 | | 2.2 | 3.7 |
| | | 10 | <0.1 | <0.1 | 500 | | 1.3 | 1.3 |
| | | | | | 900 | | 0.3 | 0.2 |

The following example is given as illustrative only without, however, limiting the invention to the specific details thereof.

15 standard cubic meters per hour of flue gas containing 1% by volume O$_2$ and originating from a fuel oil-heated furnace were passed through an adsorption tower filled with 9 liters of adsorbing coke particles. The working temperature in the tower was 120° C. The average residence time of the gases within the adsorbing layer in the tower amounted to 2.5 seconds. The SO$_2$ concentration of the flue gases varied between 700 and 900 p.p.m., i.e. between 0.07 and 0.09% by volume, of SO$_2$.

Table 2 shows the results obtained in the above-described device by using an adsorbing coke layer which had been impregnated with metal salts. By way of comparison, the results are shown which are achieved without sufficient reactivation of the adsorbing material (40 minutes), and with heat-reactivation of the adsorbing material for a sufficiently long period of time.

TABLE II.—DESULFURIZATION AT 120° C. OF A FLUE GAS WITH ADSORBING COKE OF BITUMINOUS COAL IMPREGNATED WITH CuSO$_4$ AND Fe$_2$(SO$_4$)$_3$

| Metal Salt, Weight Percent Cation | Reactivation | Degree of Desulfurization Effect in Percent after Operation (Hours) | | | | | | |
|---|---|---|---|---|---|---|---|---|
| | | 0.5 | 1 | 2 | 4 | 6 | 10 | 20 |
| 1% Cu(SO$_4$) | 900° C., 40 minutes Flue gas | 85 | 82 | 75 | 70 | 68 | 60 | 50 |
| 1% CuCl$_2$ | 900° C., 6 hours Flue gas | 100 | 100 | 100 | 95 | 91 | 75 | 73 |
| 3% Fe$_2$(SO$_4$)$_3$ | 800° C., 6 hours Nitrogen | 100 | 100 | 100 | 100 | 95 | 88 | 78 |

It is immediately apparent from Table 2 that by using an adsorbing coke which had been only slightly reactivated, the degree of desulfurization dropped already after 0.5 hour to 85%. However, similar adsorbing coke which had been reactivated for sufficiently long period of time at 900° C. will cause a much higher degree of desulfurization for a period of between about 5 and 6 hours. By impregnating with 3 percent by weight of ferric sulfate, and reactivating at 800° C., effective desulfurization can be maintained for periods of up to 9.5 hours.

Preferably, between 1 and 10% of the weight of the impregnated adsorbing agent will consist of the dry, water-soluble salt with which the carbonaceous adsorbing particles had been impregnated, or of the metal compounds formed of the salt during activation or reactivation of the adsorbing material.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of purifying a gaseous mixture including oxygen, steam and at least one sulfur oxide by removal of said sulfur oxide therefrom, comprising the steps of causing intimate contact between said gaseous mixture and a particulate solid absorbing agent consisting essentially of a carbonaceous material impregnated with a salt selected from the group consisting of water-soluble sulfates, nitrates and chlorides of at least one metal, so as to bind said sulfur oxide to said adsorbing agent in the form of SO$_3$ or H$_2$SO$_4$, thereby freeing said gas of said sulfur oxide and charging said adsorbing agent with a sulfur compound; heating the thus charged adsorbing agent at a temperature of between about 550° C. and 900° C. so as to desorb said sulfur compound and to reactivate said adsorbing agent; and subjecting the thus reactivated adsorbing agent to contact with additional gaseous mixture to be purified, for removal of sulfur oxide from the latter.

2. A method as defined in claim 1, wherein said gaseous mixture is a flue gas and said sulfur oxide is at least one oxide selected from the group consisting of SO$_2$ and SO$_3$.

3. A method as defined in claim 1, wherein said at least one metal is selected from the group consisting of copper, iron, nickel, cobalt, manganese, chromium and cerium.

4. A method as defined in claim 3, wherein said salt is sulfate.

5. A method as defined in claim 1, wherein between about 1 and 10% by weight of said adsorbing agent consists of said water-soluble salt.

6. A method as defined in claim 1, wherein said gaseous mixture is passed through a mass of particles of said solid adsorbing agent at a temperature below 200° C.

7. A method as defined in claim 6, wherein said temperature is between about 100° C. and 160° C.

8. A method as defined in claim 1, wherein said charged adsorbing agent is first heated at a temperature of between about 300° C. and 500° C. for desorbing said sulfur compound, and thereafter is heated at a temperature of between about 550° C. and 900° C. for reactivating the desorbed adsorbing agent.

9. A method as defined in claim 1, wherein said heating of said adsorbing agent is carried out under simultaneous passage of inert gas through the same.

10. A method as defined in claim 8, wherein said first heating of said charged absorbing agent is carried out under simultaneous passage of an inert gas through the same.

11. A method as defined in claim 8, wherein said heating of said adsorbing agent at a temperature of between about 550° C. and 900° C. is carried out under simultaneous passage of an inert gas through the same.

12. A method as defined in claim 1, wherein said gaseous mixture is a flue gas, said sulfur oxide includes $SO_2$, said adsorbing agent includes between 1% and 10% by weight of said water-soluble salt, said water-soluble salt is selected from the group consisting of the sulfates, nitrates and chlorides of copper, iron, nickel, cobalt, manganese, chromium and cerium, and said gaseous mixture is passed through a mass of particles of said solid adsorbing agent at a temperature of between about 100° C. and below 200° C.

No references cited.

REUBEN FRIEDMAN, *Primary Examiner.*

C. N. HART, *Assistant Examiner.*